Nov. 5, 1963 FRITZ-OTTO ZEYEN 3,109,884

REPRODUCTION PROCESS AND APPARATUS FOR CONVERTING A CORRECTED THREE-COLOR SEPARATION RECORD INTO A CORRECTED FOUR-COLOR SEPARATION RECORD

Filed April 16, 1959 2 Sheets-Sheet 2

United States Patent Office 3,109,884
Patented Nov. 5, 1963

3,109,884

REPRODUCTION PROCESS AND APPARATUS FOR CONVERTING A CORRECTED THREE-COLOR SEPARATION RECORD INTO A CORRECTED FOUR-COLOR SEPARATION RECORD

Fritz-Otto Zeyen, Heikendorf, near Kiel, Germany, assignor to Dr.-Ing. Rudolf Hell Kommanditgesellschaft, Kiel, Germany, a corporation of Germany Filed Apr. 16, 1959, Ser. No. 806,809
Claims priority, application Germany Apr. 21, 1958
4 Claims. (Cl. 178—5.2)

Figure 1:
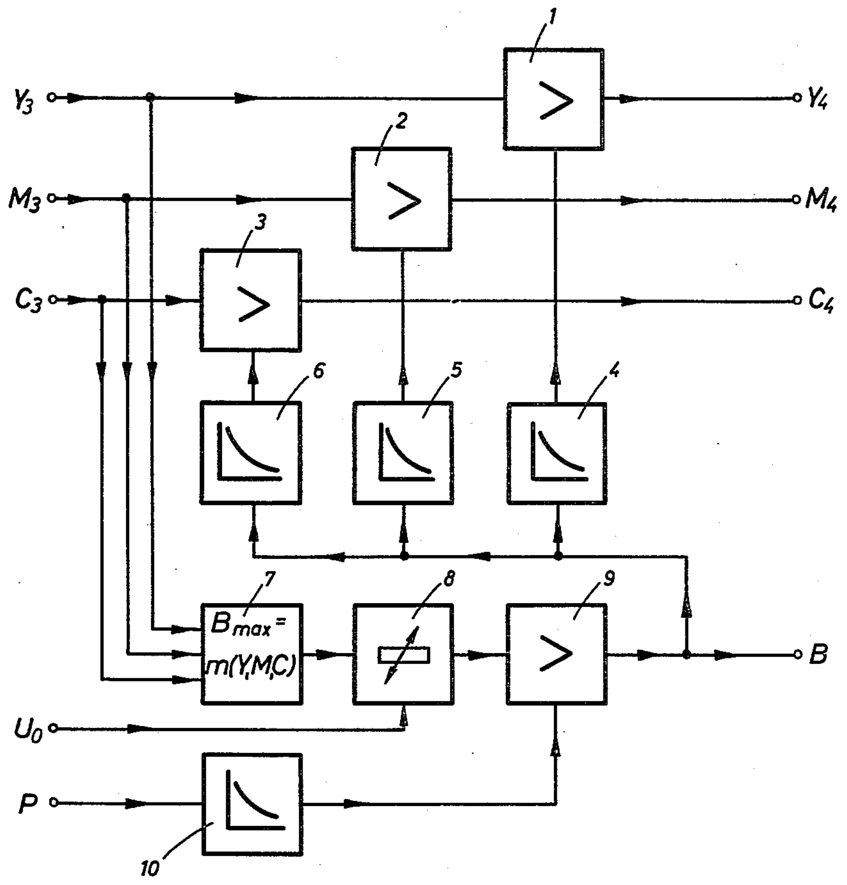

This invention relates to a reproduction process and apparatus for converting three corrected color separation records (yellow, magenta, cyan) into four corrected color separation records (yellow, magenta, cyan, black) which are equivalent in the printing result, for reproduction processes using mainly subtractive color mixing, preferable for intaglio reproduction. The invention may be considered in the nature of an improvement on the disclosure of copending application Serial No. 627,532, filed November 13, 1956, now Patent No. 2,949,499.

In the reproduction method disclosed in the copending application, the three color components (complementary transparencies) of the three color separation record are first compared with one another dot by dot and the smallest component, which provides the black component of the four color separation record in an unchanged magnitude, is selected, whereupon this smallest (black) component is subtracted from the other two color components, thereupon the two residual color components are increased as a function, which tends increasingly toward a monotone, of the smallest color component, these increased residual color components providing the color components of the four color separation record which correspond to their color.

The known color theory underlying any such conversion of a three color separation record into a four-color separation record is that a mixed color produced by specified amounts (dosages) of three printing inks being printed one above another always corresponds in color tone and saturation to a mixed color formed by appropriate amounts (dosages) of only two printing inks being printed one above another but is blackened, that is, of reduced intensity. The three-color mixture contains a "black component" which can be removed and printed separately with black (the fourth) printing ink. Where printing is performed by means of inks of four colors being placed one above another, the dosage of the three colored printing inks has to be varied according to whether all or only some of the black component is placed in the black plate (undercolor removal). At one extreme, all of the black component is placed in the black plate, in which case only two of the colored inks (in special cases only one or possibly even none) remain in a correspondingly reduced dosage, while the third ink is completely omitted. This would mean a black plate with very full contents and would correspond to extreme four-color printing. The other extreme would be pure three-ink printing, the black plate containing nothing and therefore being omitted.

Between these two extremes there are any number of intermediate states in which the black plate does not receive the highest possible dosage at each part of the image but only a fraction of such dosage. The fraction can be constant over the whole image or may depend upon any required functions of image contents. For instance, bright parts of the image may be printed with three inks, dark parts of the image may be printed with four inks and parts inetrmediate bright and dark may be printed in intermediate states, a continuous transition being provided between each kind of printing.

To satisfy these requirements in the conversion of a three color separation record into a four color separation record, the conversion disclosed in the copending application is carried into effect in a different way. In the copending application, undercolor removal of the colored inks is performed, from the circuit and functional view, parallel with the operation of calculating the black dosage. In the present invention, the black dosage must be calculated first and used to control the undercolor removal. The principle disclosed in the copending application is not thereby altered, merely the arrangement and sequence of the various functions and operations being changed, but the advantage is provided by the invention that black dosage can be varied as required in light of the viewpoints hereinbefore mentioned.

According to the invention, the generalized process resides in that the three color dosages of the three color separation records are compared with one another dot by dot and the greatest such dosage is selected in each case, that an adjustable intermediate value constant for the whole image is chosen between the color dosage 1 and this maximum color dosage and provides the black dosage of the four color separation record, and that the three color dosages of the three color separation record are increased in specified functional relationships to the (non-constant) black dosage, and that the increased color dosages provide the three color dosages of the four color separation record.

In a more general process according to a variant of the thoughts underlying the invention, the three color dosages of the three color separation record are compared with one another dot by dot, the largest color dosage is selected and is varied in a specified functional dependence upon a parameter of the color correction, preferably the brightness of one of the uncorrected color separation records, the varied color dosage providing the black dosage of the four color separation record and the three color dosages of the three color separation record being increased in specified functional dependencies upon the (non-constant) black dosage, the increased color dosages providing the three color dosages of the four color separation record.

According to another feature of the invention, the two procedures according to the invention are carried into effect by apparatus comprising three identical amplifier channels each mainly comprising a controllable amplifier, the amplifier inputs being supplied with electrical signals proportional to the color dosages of the three color separation record, while the outputs deliver electrical signals proportional to the color dosages of the four color separation record; a fourth amplifying channel having three inputs to which the three color signals of the three color separation record are supplied, the output of such fourth channel delivering the black signal of the four color separation record, the fourth amplifier channel comprising circuit means to select the greatest of the three input color signals of the three color separation record, an adjustable voltage divider between the voltage 1 and the greatest color signal voltage and a control amplifier; a fifth channel comprising functional circuit means, the input of the fifth channel being supplied with an electrical signal proportional to a parameter of the color correction, preferably the brightness of one of the uncorrected color separation records, the output of the fifth channel being connected to the control input of the controllable amplifier in the fourth channel, and three identical control channels each comprising functional circuit means, the inputs of the control channels being supplied with the black signal and the outputs of the control channels being connected to the control inputs of the control amplifiers in the first three amplifier channels.

The starting material for the conversion consists of three corrected color separation records so that color correction must precede any conversion of a three color separation record into a four color separation record. The end product correspondingly consists of corrected color separation records.

The color dosages must be distinguished by appropriate dimension numbers. In the copending application, the "complementary transparencies"—that is, the transparencies supplemented to 1—were chosen as the dosage dimension numbers, referred to as "color components." In the present invention, the transparencies are used as dosage dimension numbers, since the choice of this dimension has technical circuit advantages. Strictly speaking, the "relative reflections" of the prints produced on standard paper with black ink by means of the three or four color separation record printing forms are chosen as dosage dimension numbers. If $J_e$ denotes incident light and $J_r$ the light passing through a transparent part of the image or reflected by an opaque part of the image, the term $J_r/J_e=T\leqq 1$ can be referred to as "transparency" or "relative reflection" and the reciprocal $1/T=J_e/J_r=0$ can be referred to as "opacity." In completely opaque or deep black parts of the image where no appreciable light energy passes through or is reflected, $T=0$, while in transparent or bright white parts of the image where substantially all the light passes through or is reflected, $T=1$. The transparencies and relative reflections are stated as percentages. In contrast to the complementary transparencies and relative absorptions mentioned in the copending application, the present invention therefore deals in terms of transparencies and relative reflections, and concepts must therefore be recast since the photometric magnitudes which increase in the copending application decrease in the present invention and vice versa.

As in the copending application, the color dosages of the three-color separation record have the references $Y_3$ (yellow), $M_3$ (magenta), $C_3$ (cyan), while the corresponding color dosages of the four color separation record have the references $Y_4$, $M_4$, $C_4$ and the black dosage has the reference B, the index 3 being associated with the three color separation record and the index 4 being associated with the four-color separation record.

In the electrical apparatus for realizing the invention, the color dosages are represented by electrical signals which are proportional to such dosages and which can be produced in any required manner, for instance, by photoelectric scanning of color separation records available as photographic positives or negatives. To obviate the introduction of further terms, these proportional electric signals have the references $Y_3$, $M_3$ $C_3$ and $Y_4$, $M_4$, $C_4$ and B. The signals can be direct current or alternating current voltages.

Figure 2:
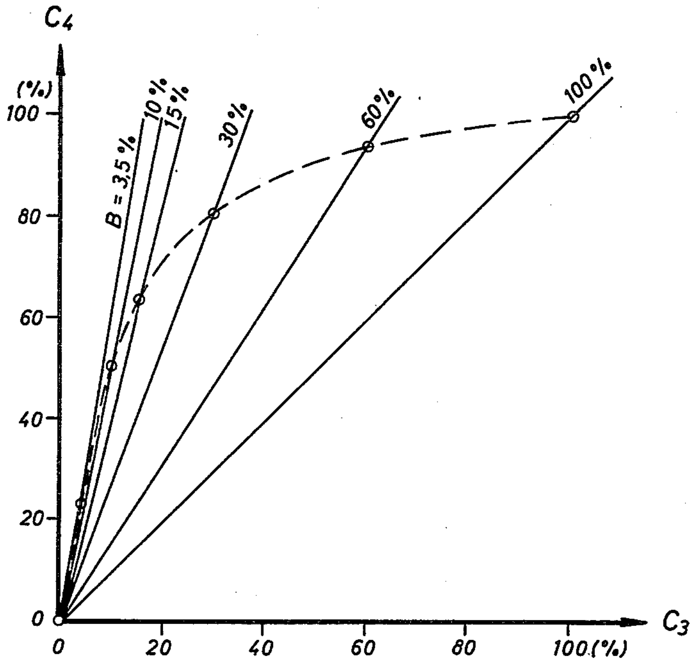
Figure 3:
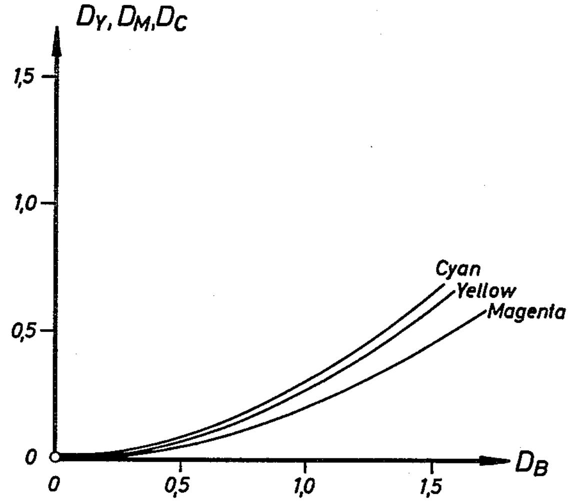

The invention will be explained in greater detail with reference to FIGS. 1–3 wherein:

FIG. 1 illustrates in block diagram manner the basic circuit arrangement of the electrical apparatus for realizing the invention;

FIG. 2 illustrates in graph form the dependence of the dosage of one color of the four color separation record upon the dosage of the corresponding color of the three color separation record, the black dosage being used as parameter; and FIG. 3 illustrates in graph form, in connection with the reproduction of gray tones, the dependencies of the remaining color densities of the three color separation records upon the color density of the black separation record.

As shown in FIG. 1, the corrected three color dosage voltages $Y_3$, $M_3$, $C_3$ of the three color separation record are supplied in three "color channels" to three identical linear controllable amplifiers, 1, 2, 3, the outputs of which deliver the corrected color dosage voltages $Y_4$, $M_4$, $C_4$ of the four color separation record. The amplifying factors of the three controllable amplifiers are governed by the functional circuit means 4–6 in accordance with three specified functions of the black dosage voltage B as already described in the copending application.

The black dosage B is calculated as follows:

The maximum black dosage $B_{max}$, corresponding to the case of "extreme four color printing," is first calculated. Following the principle disclosed in the copending application and on the basis of the color dosage dimension used in this invention, the voltage $B_{max}$ is the greatest of the three color dosage voltages $Y_3$, $M_3$, $C_3$. This maximum voltage $B_{max}$ is calculated in a fourth channel by the circuit means 7 to which the three color dosage voltages $Y_3$, $M_3$, $C_3$ are supplied simultaneously and which is of similar design to the circuit means described in the copending application for selecting the smallest of three voltages. The maximum value varies continuously as the image contents are scanned. The other extreme in the case of pure three color printing is given by the constant value $B=1$. By means of the control circuit arrangement in the fourth amplifier channel, any desired intermediate value can be provided between the two extremes $B=1$ and $B=B_{max}$. For instance, if the black dosage B is required to have an intermediate value, constant over the whole image, between pure three color printing and extreme four color printing, the control circuit arrangement comprises an adjustable voltage divider 8, for instance, in the form of a potentiometer, one end of which is connected to the maximum black dosage voltage $B_{max}$ and the other end of which is connected to a constant voltage $U_0$ proportional to the black dosage $v=1$, the black dosage voltage B being derived from the potentiometer slide. This intermediate value B is amplified in the amplifier 9 and the black dosage voltage B thus obtained is delivered at the output of the amplifier 9.

If the intermediate value of the black dosage B is required to vary, in such manner that bright parts of the image are printed in three color form and dark parts of the image are printed in four color form with a continuous transition of the black dosage, the amplifier 9 takes the form of a controllable amplifier, the control input of which is provided with a control voltage which amplifies $B_{max}$ in a specified functional dependence upon a parameter voltage P of the color correction. The voltage divider 8 is then so adjusted as to deliver $B_{max}$. This functional dependence is produced in a fifth channel in the functional circuit means 10. The parameter P for controlling color correction is preferably the brightness of one of the uncorrected color separation records, for instance, of the yellow or magenta separation record.

As already stated, the amplifying factors of the amplifiers 1—3 for the color dosage voltages are controlled by the black dosage voltage B. This means, in accordance with the conditions described in the copending application and in the light of the color dosage dimensions used in the present invention, that a gray scale in the original image is represented, in the case of extreme four color printing, only by the black color separation record, all three colored inks disappearing. For technical reasons connected with printing, however, it is desirable not to lose all the colors when reproducing the dark gray to black tones of the gray scale but to leave the colors in a small residual dosage below the black. This can be achieved if the amplification of the controllable amplifiers 1—3 in the three color channels is appropriately controlled by the functional circuit means 4—6.

FIG. 2 illustrates in graph form, with reference to a cyan separation record, the transition curves of a color control amplifier with the (variable) black dosage B as parameter for the case in which residual color dosages are left below the dark gray tones. The illustration takes the form of a family of straight amplifier characteristics marked with the black dosages. The dependence between $C_4$ and $C_3$ is non-linear and can be stated as $C_4=v.C_3$, $v=f(B)$, the amplification factor, being a non-constant function of the black dosage B. This dependence is indicated by the dash line curve. The amplification of the color dosage of the four-color separation record increases in proportion as the black dosage is smaller, being least—that is, equal to 1—when the black dosage $B=1$.

In the graph illustrated in FIG. 3, three curves denote the dependencies of the color densities $D_Y$, $D_M$, $D_C$ (=logarithms of opacities) of the three color separation records of the four-color separation record upon the color density $D_B$ of the black color separation record for an exemplary case in which the other three colors are present in a residual color density of about 0.7 below a full black tone and rapidly decrease to zero towards the lighter gray tones in the manner most suitable for printing. The dependence of the residual color density $D_C$ of the blue color separation record upon the color density $D_B$ of the black color separation record is allowed for and illustrated in the dash line curve shown in FIG. 3 in the transparency scale ($T=e^{-D}$).

Changes may be made within the scope and spirit of the appended claims which define what is believed to be new and desired to have protected by Letters Patent.

I claim:

1. Reproduction process for converting three corrected color separation records (yellow, magenta, cyan) into four corrected color separation records (yellow, magenta, cyan, black) which are equivalent in the printing result, for reproduction processes using mainly subtractive color mixing, preferably for intaglio reproduction, comprising comparing the three color dosages of the three corrected color separation records with one another dot by dot and selecting in each case the greatest such dosage, selecting an adjustable intermediate value constant for the whole image between the color dosage corresponding to a minimum black value and said maximum color dosage to provide the black dosage of the four color separation record, and increasing the three color dosages of the three color separation record in predetermined functional relationships to the (non-constant) black dosage, the increased color dosages providing the three color dosages of the four color separation record.

2. Reproduction process for converting three corrected color separation records (yellow, magenta, cyan) into four corrected color separation records (yellow, magenta, cyan, black) which are equivalent in the printing result, for reproduction processes using mainly subtractive color mixing, preferably for intaglio reproduction, comprising comparing the three color dosages of the three corrected color separation record with one another dot by dot, selecting the largest color dosage and varying it in a predetermined functional dependence upon a parameter of the color correction, preferably the brightness of one of the uncorrected color separation records, the varied color dosage providing the black dosage of the four color separation record and the three color dosages of the three color separation record being increased in predetermined functional dependencies upon the (non-constant) black dosage, the increased color dosages providing the three color dosages of the four color separation record.

3. Apparatus for realizing the method according to claim 1, comprising, in combination, three identical amplifier channels each mainly comprising a controllable amplifier, the amplifier inputs being supplied with electrical signals proportional to the color dosages of the three color separation record, while the outputs deliver electrical signals proportional to the color dosages of the four color separation record; a fourth amplifying channel having three inputs to which the three color signals of the three color separation record are supplied, the output of such fourth channel delivering the black signal of the four color separation record, the fourth amplifier channel comprising circuit means to select the greatest of the three input color signals of the three color separation record, an adjustable voltage divider between the voltage corresponding to a minimum black value and a greatest color signal voltage and a control amplifier; and three identical control channels each comprising non-linear circuit means, the inputs of the control channels being supplied with the black signal and the outputs of the control channels being connected to the control inputs of the controllable amplifiers in the first three amplifier channels.

4. Apparatus for realizing the process according to claim 2, comprising, in combination, three identical amplifier channels each mainly comprising a controllable amplifier, the amplifier inputs being supplied with electrical signals proportional to the color dosages of the three color separation record, while the outputs deliver electrical signals proportional to the color dosages of the four color separation record; a fourth amplifying channel having three inputs to which the three color signals of the three color separation record are supplied, the output of such fourth channel delivering the black signal of the four color separation record, the fourth amplifier channel comprising circuit means to select the greatest of the three input color signals of the three color separation record, an adjustable voltage divider between the voltage corresponding to a minimum black value and a greatest color signal voltage and a control amplifier; a fifth channel comprising functional circuit means, the input of the fifth channel being supplied with an electrical signal proportional to a parameter of the color correction, preferably the brightness of one of the uncorrected color separation records, the output of the fifth channel being connected to the control input of the controllable amplifier in the fourth channel, and three identical control channels each comprising non-linear circuit means, the inputs of the control channels being supplied with the black signal and the outputs of the control channels being connected to the control inputs of the controllable amplifiers in the first three amplifier channels.

References Cited in the file of this patent

UNITED STATES PATENTS

| | | |
|---|---|---|
| 2,766,319 | Hall | Oct. 9, 1956 |
| 2,873,312 | Moe | Feb. 10, 1959 |
| 2,892,016 | Hall | June 23, 1959 |
| 2,947,805 | Moe et al. | Aug. 2, 1960 |
| 2,981,792 | Farber | Apr. 25, 1961 |